(12) United States Patent  
Cho et al.

(10) Patent No.: US 7,973,842 B2
(45) Date of Patent: *Jul. 5, 2011

(54) HIGH INTRASCENE DYNAMIC RANGE NTSC AND PAL IMAGER

(75) Inventors: Kwang-Bo Cho, Los Angeles, CA (US); Igor Subbotin, South Pasadena, CA (US); Michael Kaplinsky, South Pasadena, CA (US); Sandor L. Barna, Pasadena, CA (US); Gary E. Slayton, Pear Blossom, CA (US)

(73) Assignee: Aptina Imaging Corporation, George Town (KY)

( * ) Notice: Subject to any disclaimer, the term of this patent is extended or adjusted under 35 U.S.C. 154(b) by 386 days.

This patent is subject to a terminal disclaimer.

(21) Appl. No.: 12/081,302

(22) Filed: Apr. 14, 2008

(65) Prior Publication Data

US 2008/0218621 A1 Sep. 11, 2008

Related U.S. Application Data

(63) Continuation of application No. 10/230,205, filed on Aug. 29, 2002, now Pat. No. 7,382,407.

(51) Int. Cl.
*H04N 5/335* (2006.01)

(52) U.S. Cl. ........ 348/296; 348/304; 348/305; 348/308; 257/291; 257/292

(58) Field of Classification Search .............. 348/257, 348/395, 396, 304, 305, 308, 295, 296; 257/291, 257/292
See application file for complete search history.

(56) References Cited

U.S. PATENT DOCUMENTS

| | | | |
|---|---|---|---|
| 5,420,635 A * | 5/1995 | Konishi et al. | 348/362 |
| 5,471,515 A | 11/1995 | Fossum et al. | |
| 5,587,596 A | 12/1996 | Chi et al. | |
| 5,589,880 A | 12/1996 | Tsukui | |
| 5,600,696 A | 2/1997 | Sauer | |
| 5,841,126 A | 11/1998 | Fossum et al. | |
| 5,872,595 A | 2/1999 | Monahan | |
| 5,920,345 A | 7/1999 | Sauer | |
| 6,008,486 A * | 12/1999 | Stam et al. | 250/208.1 |
| 6,040,570 A | 3/2000 | Levine et al. | |
| 6,115,065 A * | 9/2000 | Yadid-Pecht et al. | 348/308 |
| 6,180,935 B1 | 1/2001 | Hoagland | |
| 6,188,433 B1 | 2/2001 | Orbock | |
| 6,211,915 B1 * | 4/2001 | Harada | 348/298 |
| 6,289,139 B1 | 9/2001 | Chen et al. | |
| 6,317,154 B2 | 11/2001 | Beiley | |
| 6,320,616 B1 | 11/2001 | Sauer | |

(Continued)

OTHER PUBLICATIONS

I.L. Fujimori, (C.G. Sodini), A Differential CMOS Passive Pixel Imager, pp. 28-29.

(Continued)

*Primary Examiner* — Nhan T Tran
*Assistant Examiner* — Chriss S Yoder, III

(57) ABSTRACT

The invention provides a new method and apparatus for NTSC and PAL image sensors which employs fusion of adjacent row pixel charge samples to generate image data for a row. A variety of fusion schemes are possible for fusing the pixel signals from the adjacent rows. The rows of pixels are scanned so that each scan takes an odd row signal sample and, in some cases, an adjacent even row signal sample when specified conditions are met. One sampled row of the two adjacent rows integrate an image with a first integration period while the other adjacent row integrates an image with a second integration period.

20 Claims, 8 Drawing Sheets

U.S. PATENT DOCUMENTS

| | | | |
|---|---|---|---|
| 6,429,898 B1 | 8/2002 | Shoda et al. | |
| 6,606,121 B1* | 8/2003 | Bohm et al. | 348/297 |
| 6,831,689 B2* | 12/2004 | Yadid-Pecht | 348/297 |
| 2002/0027189 A1* | 3/2002 | Murakami et al. | 250/208.1 |
| 2002/0100862 A1* | 8/2002 | Liu | 250/208.1 |
| 2005/0128329 A1* | 6/2005 | Barna et al. | 348/308 |
| 2006/0119717 A1* | 6/2006 | Barna | 348/300 |

OTHER PUBLICATIONS

Jim Adams, Ken Parulski, Kevin Spaulding; Color Processing in Digital Cameras, Micro, IEEE, pp. 20-29, Nov.-Dec. 1998, Micro, IEEE.

Stuart Kleinfelder, Sukhwan Lim, Xinqiao Liu, and Abbas El Gamal; A 10,000 Frames/s CMOS Digital Pixel Sensor, IEEE Journal of Solid-State Circuits, vol. 36, No. 12, pp. 2049-2059, Dec. 2001.

PB-0100/PB-0101 1/5 Inch CMOS Active-Pixel Digital Image Sensors, Product Specification, Mar. 2000 (Version 3.0).

Kevin Buckley, Selecting an Analog Front End for Imaging Applications, vol. 34, No. 06, pp. 1-8, Oct. 2000; [retrieved on Jul. 26, 2002]. Retrived from the Internet: <URL: http://www.analog.com/library/analogdialogue/archives/34-06/imaging/>.

Stuart A. Taylor, CCD and CMOS Imaging Array Technologies: Technology Review; Technical Report EPC-1998-106, pp. 1-14, 1998.

* cited by examiner

HIGH INTRASCENE DYNAMIC RANGE NTSC AND PAL IMAGER

FIELD OF THE INVENTION

This application is a continuation application of Ser. No. 10/230,205, filed Aug. 29, 2002, now U.S. Pat. No. 7,382,407, the disclosure of which is incorporated by reference in its entirety.

The present invention relates generally to improved semiconductor imaging devices, and in particular to a CMOS imaging device having a high intrascene dynamic range.

BACKGROUND OF THE INVENTION

An important performance characteristic of imaging devices is dynamic range. A large dynamic range is desirable in applications for sensing low light signals and capturing images with large variations in illuminance or brightness.

In particular, the dynamic range of an image sensor can be defined as the ratio of the minimum illuminance the sensor detects under saturation to the illuminance the sensor detects at signal-to-noise ratio (SNR) equal to 1. The dynamic range of a scene can also be expressed as the ratio of its highest illumination level to its lowest illumination level.

Intrascene dynamic range refers to the range of incident signal that can be accommodated by a sensor in a single frame of imager data. Examples of scenes that generate high dynamic range incident signals include an indoor room with outdoor window, outdoor mixed shadow and bright sunshine, night time scenes combining artificial lighting and shadows, and in automotive context, an auto entering or about to leave a tunnel or shadowed area on a bright day.

Many different types of approaches for creating devices with high dynamic range have been described in the literature. A common denominator of most approaches rely on performing companding within the pixel by a having either a total conversion to a log scale (so-called logarithmic pixel) or a mixed linear and logarithmic response region in the pixel. These approaches have several major drawbacks. First, the knee point in linear-to-log transition is difficult to control leading to fixed-pattern noise in the output image. Second, under low light the log portion of the circuit is slow to respond leading to lag. Third, a logarithmic representation of the signal in the voltage domain (or charge domain) means that small variations in signal due to fixed pattern noise leads to large variations in represented signal.

Linear approaches have also been used to increase dynamic range where the integration time is varied during a frame capture to generate several different integrated pixel signals. In the context of a CMOS pixel, integration time refers to the time period during which a capacitor or charge well accumulates a charge or discharges a voltage from a pre-charge level (from a reset voltage) as a result of exposure of a photosensor to incident light. The integrated signal is then read-out and sampled. If a CMOS pixel's stored charge rises or falls to a point where it cannot further increase or decrease during the integration period, then it is said that the CMOS pixel has reached its saturation point. Conventional implementations which vary integration time during frame capture require additional logic and memory structures to store data generated by reading out the pixel at different points in time and thus are less than optimal as a design choice.

FIG. 1 shows how changes in integration time affects the magnitude of light intensity which a CMOS sensor can absorb without reaching the saturation voltage 1 thereby avoiding loss of image data. In particular, the FIG. 1 example demonstrates the behavior of the output signal from a pixel with a long integration time 2 and a short integration time 3.

Capturing still images with different integration times and then merging them is an effective way to extend the dynamic range of a linear sensor without losing contrast at high light level, in a manner similar to how nonlinear sensors perform. For a linear sensor, a signal output S is proportional to light intensity and integration time. With a constant light input I over an integration time $T_{int}$, the signal output can be expressed as $$S = k_s \cdot I \cdot T_{int} \qquad (1)$$

where $k_s$ is the pixel's sensitivity.

For the example shown in FIG. 1, with one integration period 4, the sensor's dynamic range is independent of integration time, which is $$DR = \frac{\text{Saturation voltage}}{\text{Read noise}} = \frac{I_{Lmax}}{I_{Lmin}} = \frac{I_{Smax}}{I_{Smin}} \qquad (2)$$

where $I_{Lmax}$ 5 is the minimum light intensity which causes the pixel to saturate with integration time $T_L$. $I_{Lmin}$ 6 is the light intensity when signal output equals read noise with integration time $T_L$. $I_{Smax}$ 7 is the minimum light intensity which causes the pixel to saturate with integration time $T_S$. $I_{Smin}$ 8 is the light intensity when signal output equals read noise with integration time $T_S$. With two integration times (i.e., range 9), the extended dynamic range $DR_{ext}$ can be expressed as $$DR_{ext} = \frac{I_{Smax}}{I_{Lmin}} = \frac{T_L}{T_S} \cdot DR \qquad (3)$$

Accordingly, dynamic range (DR) is extended by the ratio of the long integration time to the short integration time. For example, if long integration time is 20 and short integration time is 4, then DR is multiplied by a factor of 5.

A multiple integration approach was first used in CCD sensors to increase dynamic range. A similar approach was used in CMOS active pixel sensors and in charge multiplication devices (CMD) and since its initial use, the multiple integration approach has become one of the most commonly used techniques in high dynamic range sensors.

A conventional high dynamic range imager uses two sample and hold circuits: one is a linear sample and hold circuit for each column of the array and captures a linear signal related to a difference between the pixel image output signal and a reset output signal to which the pixel is reset at the beginning of the integration period. The other is an extended dynamic range (XDR) sample and hold circuit for each column of the array which captures an XDR signal related to a difference between the pixel image output signal and an XDR reset level to which the pixel is reset at a predetermined time before the end of the integration period.

A high intrascene dynamic range CMOS active pixel sensor using dual sampling has been previously created but has a number of shortcomings. For example, a second column signal processing chain circuit and associated sample and hold circuit must be added to the upper part of the CMOS sensor. During operation, row n is first selected for read out and copied into a lower sample and hold circuit. Row n is reset in the process. Immediately after row n is read out, row n−Δ is then selected and sampled into the upper sample and hold circuit. Row n−Δ is also reset as a consequence of being copied. Both sample and hold circuits are then scanned to read out stored data. After the two sample and hold circuits are read out, the row address increases by one, and the whole process starts over again. In this readout scheme, the second readout always lags Δ rows behind the first read out. If integration time is defined for the pixels copied to the lower sample and hold circuit as T1int, while the integration time for pixels copied to the upper sample and hold circuit as T2int, the ratio of T1int:T2int is (N−Δ):Δ. The intrascene dynamic range capability of the sensor is extended by the factor T1int/T2int.

There are several advantages of the dual sampling approach. First, linearity of the signal is preserved. Second, no modification to the standard CMOS APS pixel is required to achieve high dynamic range so that fill factor and pixel size can be optimized. Third, the low read noise of the CMOS APS pixel is preserved. Fourth, the extended dynamic range operation can be optionally employed, depending on control signals to the chip, without sacrificing sensor performance.

A major disadvantage of the dual sampling approach is that outputting the signal for two integration periods requires an additional analog memory on chip to synchronize these outputs. Another shortcoming is that dual sampling has not been optimally implemented for use with Phase Alternating Line (PAL) and National Television Standards Committee (NTSC) standard compliant image sensors.

The NTSC standard is the one most commonly used for video standards in North America and Japan. Europe uses PAL and the French use SECAM video standards. Both PAL and NTSC are 4:3 horizontal-to-vertical picture aspect ratios. Most television video transmitters and receivers use interlaced scanning rather than the non-interlaced progressive scanning.

Conventional dual sample image sensors using the NTSC and PAL format produce interlaced output, not progressive scan-output (non-interlaced). As shown in FIG. 2, an image frame 15 containing rows and columns of pixels is divided into two fields: an odd field (Field 1) 13 consisting of all the odd numbered rows of pixels, and the even field (Field 2) 14 consisting of all the even numbered rows of pixels. The two fields per frame scheme is known as a 2:1 interlace. Half of the frame is recorded by the odd field at time T1, and the other half of the frame is recorded by the even field at time T2. Progressive scan sensors read out a complete frame with no interlacing one row at a time. Progressive scan methods have desirable attributes such as better image capture for subjects which are moving. Thus, it would be desirable to have an increased dynamic image CMOS image sensor which is NTSC and PAL compliant and which provides a progressive scan output.

BRIEF SUMMARY OF THE INVENTION

The invention provides a new method and apparatus for NTSC and PAL image sensors. The rows of pixels are scanned so that each scan takes an odd row signal sample and, in some cases, an adjacent even row signal sample when specified conditions are met. One sampled row of the two adjacent rows integrate an image with a first integration period while the other adjacent row integrates an image with a second integration period. A fusion of adjacent row pixel image samples occurs to generate image data for a row. A progressive scan of pixel rows is accomplished starting one end of the pixel array and continues until all adjacent row sets are selectively sampled and processed. A variety of fusion schemes are possible for fusing the pixel signals from the adjacent rows.

The above and other features and advantages of the invention will be more readily understood from the following detailed description of the invention which is provided in connection with the accompanying drawings.

DETAILED DESCRIPTION OF THE INVENTION

Conventional interlaced NTSC or PAL image sensors perform imaging in two field captures at two time periods. Performing NTSC or PAL compatible image capture using progressive scan style with dual sampling requires another approach. For example, referring to FIG. 3, samples with different integration time can be taken from two adjacent odd and even rows to produce each field of an NTSC and PAL image sensor so that high intrascene dynamic range is achieved with minimized circuitry. A fusion algorithm can then be used to produce progressive style output using image signals from adjacent rows of pixels where the pixels of odd and even rows have different integration times.

Figure 1:
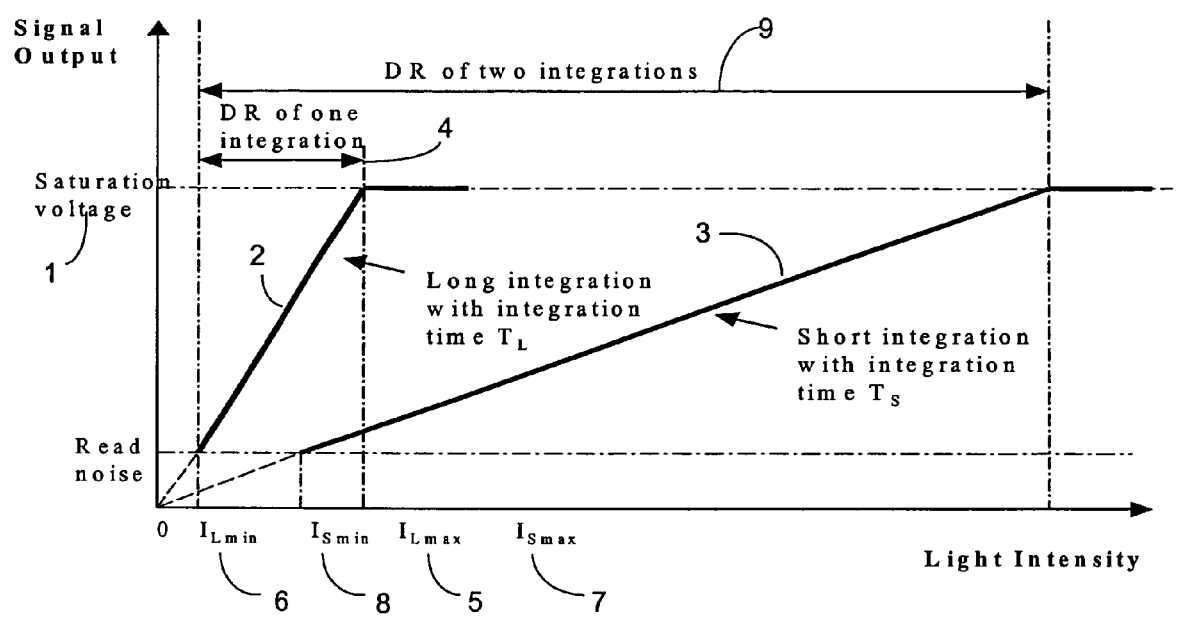
FIG. 1 shows a dynamic range extension for linear sensors using two integration times.
Figure 2:
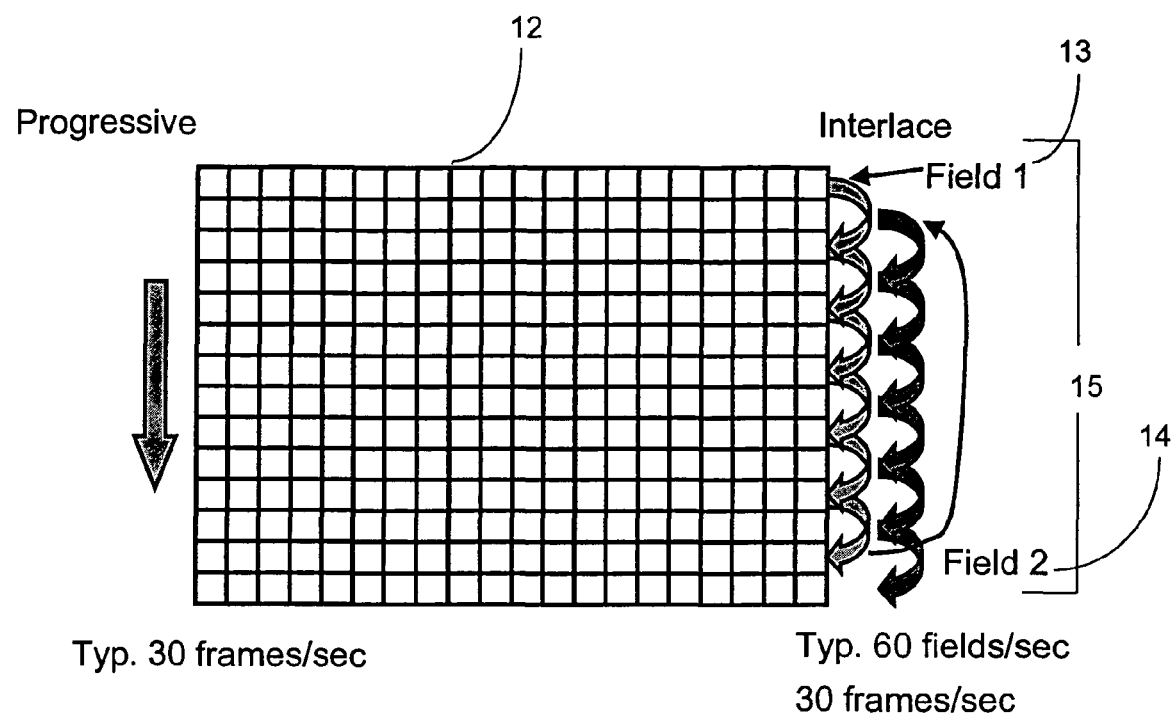
FIG. 2 shows a comparison between progressive and interlaced scan scheme.
Figure 3:
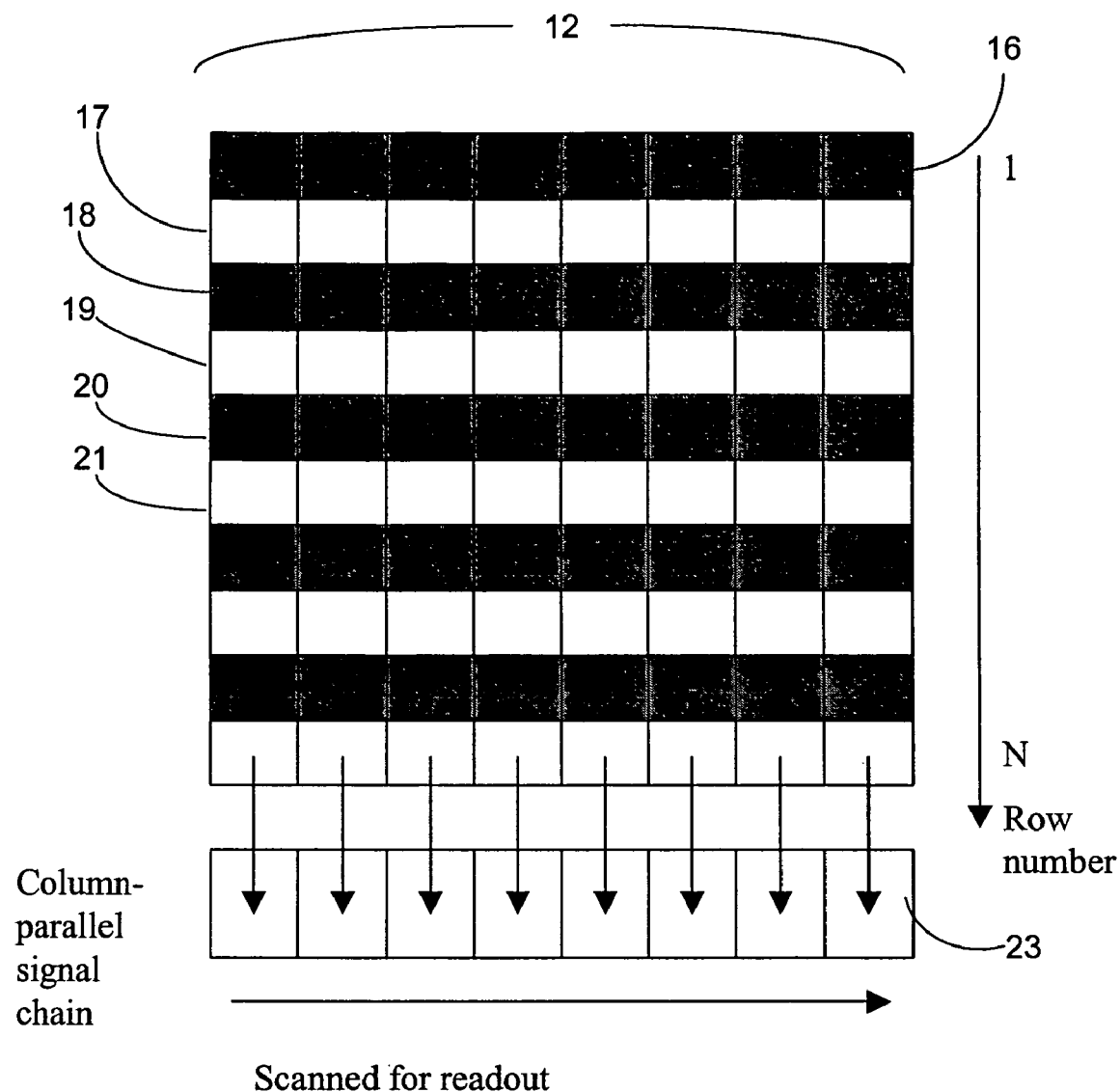
FIG. 3 shows row organization of an imager matrix coupled to a column-parallel signal chain.

Referring to FIG. 3, integration can be performed within a pixel array 12 where odd rows (e.g., 16, 18, 20) of pixels and even rows (e.g., 17, 19, 21) of pixels have different integration periods. In an exemplary embodiment, odd row pixels have a longer integration period, $T_{long}$, which commences first to provide a pixel signal $Vsig_{Long}$ and even row pixels have a short integration period $T_{short}$ to provide a pixel signal output $Vsig_{Short}$. Two pixel samples from pixels in adjacent odd (e.g., 16) and even rows (e.g., 17) that are in the same column can be used as inputs to a fusion algorithm circuit to begin to produce a portion of a field. Next, another adjacent two pixel samples from the same column can be sampled and input into a fusion algorithm to produce another portion of a field. The process of progressive adjacent row scanning with long and short integration times for adjacent pixels within a column is repeated until all of the rows in a pixel array are sampled, processed and output. Each pixel which is sampled provides a sampled pixel signal Vrst and a sampled image signal Vsig to a column line sample and hold circuit which performs the fusion operations.

Figure 4:
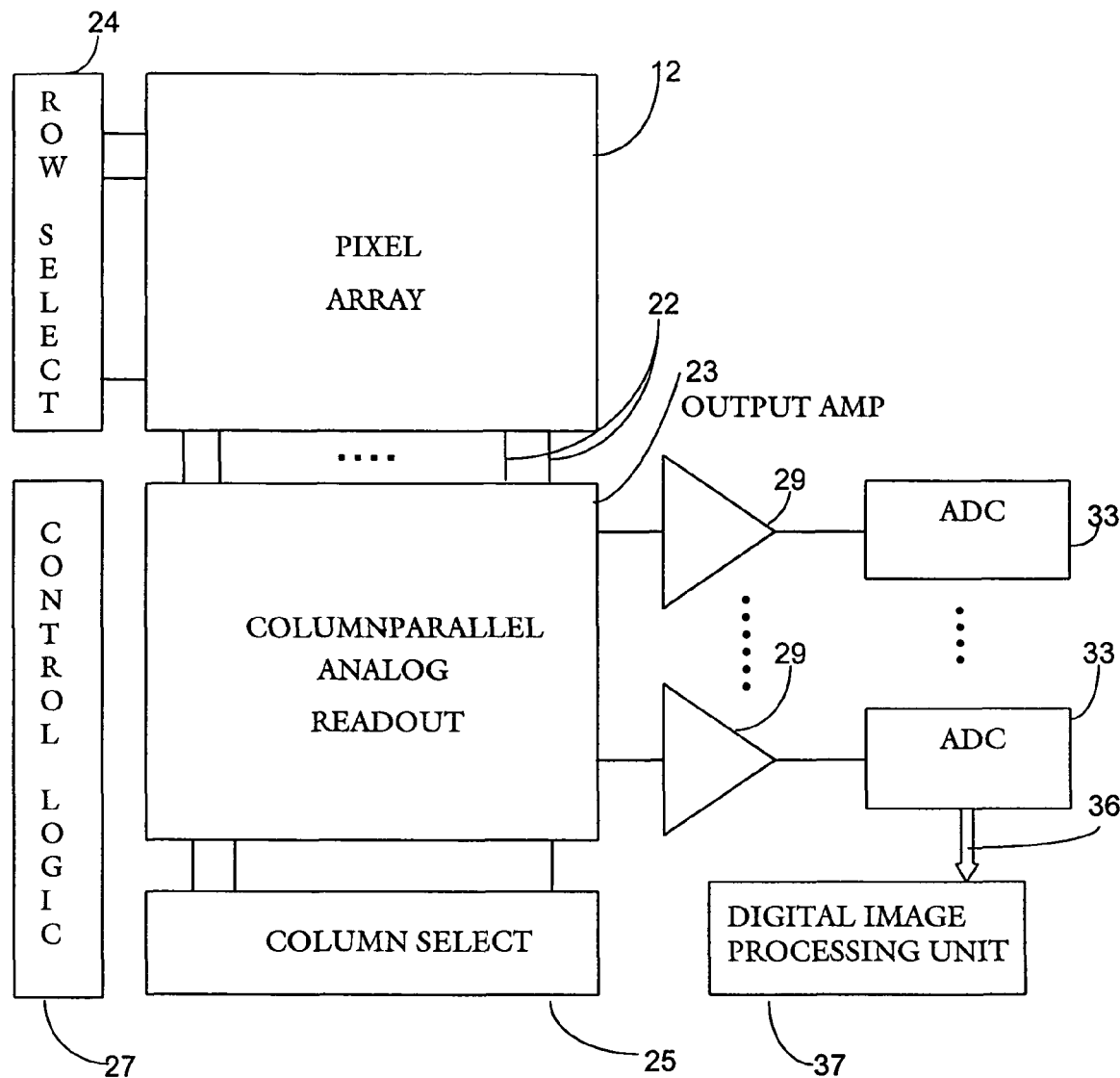
FIG. 4 shows a basic architecture of a high dynamic range CMOS image sensor.

FIG. 4 shows one embodiment of an exemplary basic architecture of a high dynamic range CMOS image sensor with dual sampling of adjacent rows in a pixel array 12. The exemplary sensor includes a pixel array 12 coupled to a column-parallel analog readout circuitry 23 as well as row select 24 and column select circuits 25. A plurality of circuits which implement the functions of a fusion algorithm (described below) are formed within the column-parallel analog readout 23, each one coupled to a column line 22 in the pixel array 12 (inputs) and an output amplifier 29 (output). A control logic 27 unit controls column select unit 25 and row select unit 24 operations as well as operations within the column-parallel analog readout circuitry 23. Each one of a plurality of on-chip analog to digital converters (ADC) 33 are coupled to one of the plurality of output amplifiers 29. A bus 36 carries signals from the plurality of ADCs 33 to an on-chip digital image processing unit 37. The digital image processing unit performs on chip image processing such as color pixel processing. The control logic circuitry 27 provides timing control of sensor components including switch operation within the circuit implementations of the fusion algorithms and pixel circuits.

A variety of fusion algorithms can be used for processing pixel data from adjacent rows with different integration time durations. Sampled pixel data includes $Vsig_{Long}$ and $Vrst_{Long}$ for the pixel having the long integration time and $Vrst_{Short}$ and $Vsig_{Short}$ for the pixels with the short integration time. An exemplary implementation for each exemplary algorithm will be further explained below. A selection based fusion algorithm which compares a pixel signal $Vsig_{Long}$ with a threshold is as follows:

```
if ( Vsig_Long > Threshold Level (V_threshold) )
   then
       pixel output = Vrst_Long – V sig_Long,
       Flag = "0" and
       Data Output = ADC Output
   else
       pixel output = Vrst_Short – Vsig_Short,
       Flag = "1" and
       Data Output = (T_Long / T_Short) * ADC Output ...... (4)
```

Figure 5:
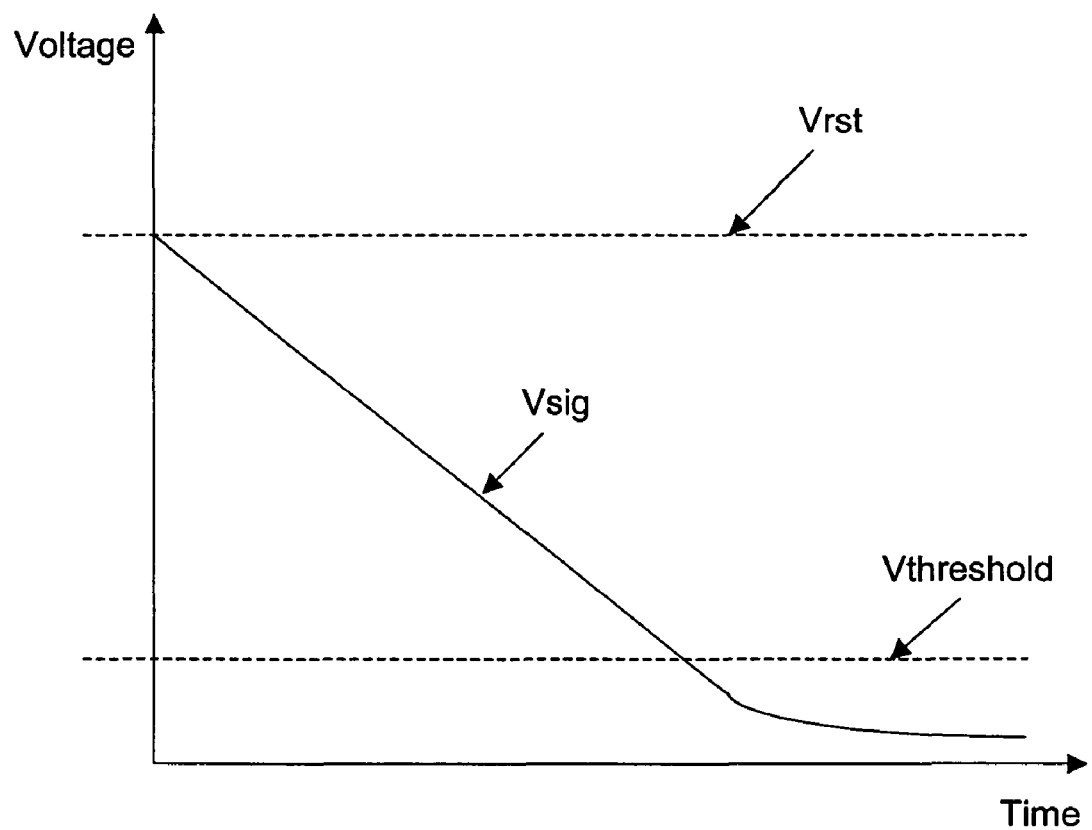
FIG. 5 shows integration behavior of a CMOS imager pixel with respect to voltage over time.

Referring to FIG. 5, saturation is not reached until Vsig falls below $V_{threshold}$. Therefore, the $V_{threshold}$ in exemplary Algorithm 4 should be set at a value close to the pixel saturation level or (Vrst–ADC reference voltage level) at GAIN=1. Accordingly, $Vsig_{Long}$ will be used as long as a sampled pixel's signal voltage remains larger than $V_{threshold}$. Data output in Algorithm 4 is the digital output from the ADC. Pixel output in Algorithm 4 is the difference between the initial state (Vrst) and the final state (Vsig) after a either a long or short integration in a pixel is concluded. The pixel output (Vrst–Vsig) is proportional to the integration time. The longer integration time, the larger the difference in a pixel output voltage from Vrst will be obtained up to the point of saturation voltage levels. ADC output occurs once for every two rows in an embodiment which incorporates an Algorithm 4.

The value of Vsig is compared to the voltage threshold level. Assuming no gain (Gain=1), then the compared value of |Vrst–Vsig| is output to the ADC 33 (FIG. 4) and then compared with ADC's 33 reference voltage. Thus, it is desirable for |Vrst–Vsig| to be close to the ADC reference voltage. The threshold voltage compared to Vsig will be |Vrst–ADC reference voltage|. For example, given a power supply at 3.3 V and Vrst=2V, Vsig can be below 1V. However, if an ADC 33 voltage reference is only 1V, then more than 1V of the difference |Vrst–Vsig| is not useful for use by the ADC, 33 for analog to digital conversion. Consequently, given the parameters of 3.3V ADC power supply and Vrst of 2V, the threshold voltage optimally can be set at 1V.

More flexibility with respect to threshold voltage settings and ADC 33 function can be obtained by use of the output amplifier 29. For example, assuming a gain stage is between the analog column parallel circuit 23 and ADCs 33, at gain=2, even if |Vrst–Vsig|=0.5V, after the gain stage a 0.5×2=1V output swing is produced which is same as the previously assumed ADC reference voltage. Thus, a $V_{threshold}$=1.5 V=|Vrst–ADC reference voltage/GAIN|=|2–½ can be used with an operational amplifier to provide more flexibility in selecting threshold levels. Threshold voltage settings can be changed freely in order to meet the requirements and design parameters of a given fusion algorithm design. A flag (explained below), can be set by a comparator and used to enable a subsequent sampling operation after comparison with the $V_{threshold}$.

Another possible fusion algorithm uses averages as follows:

$$S=((Vrst_{Long}-Vsig_{Long})+(Vrst_{Short}-Vsig_{Short}))/2 \text{ and}$$

Data Output=ADC output    (5)

where S comprises the fused Vsig value in the sampling capacitor for storing post-integration charge which is averaged then output to the ADC from the pixel capacitor. Data output is the digital signal that is sent to an image processing unit for image processing.

Yet another possible fusion algorithm uses a selection and average-based approach.

```
If ( Vsig_Long > Threshold Level (V_threshold))
   then
       Pixel Output = [(Vsig_Long + Vsig_Short )/2 – (Vrst_Long + Vrst_Short )/2],
       Flag = "0" and
       Data Output = ADC output.
   else
       Pixel Output = Vsig_Short – Vrst_Short,
       Flag = "1" and
       Data Output = ADC output .................. (6)
```

Algorithm 6 shows that averaging of pixel signals from a long integration row and short integration row will be done when $Vsig_{Long}$ is greater than threshold value $V_{threshold}$, which represents pixel saturation voltage. Once the pixel signal of a pixel in a row with a long integration time is lower than the $V_{threshold}$ (Vsig<$V_{threshold}$), only pixel signals from a row with a short integration time (i.e., even row) will be output to an analog to digital converter (ADC).

A exemplary sample and hold circuit capable of executing an embodiment of a Selection-Based fusion Algorithm 4 implementation will now be explained with reference to circuits shown in FIGS. 3, 4, 6a and timing diagram of FIG. 6b.

Figure 6A:
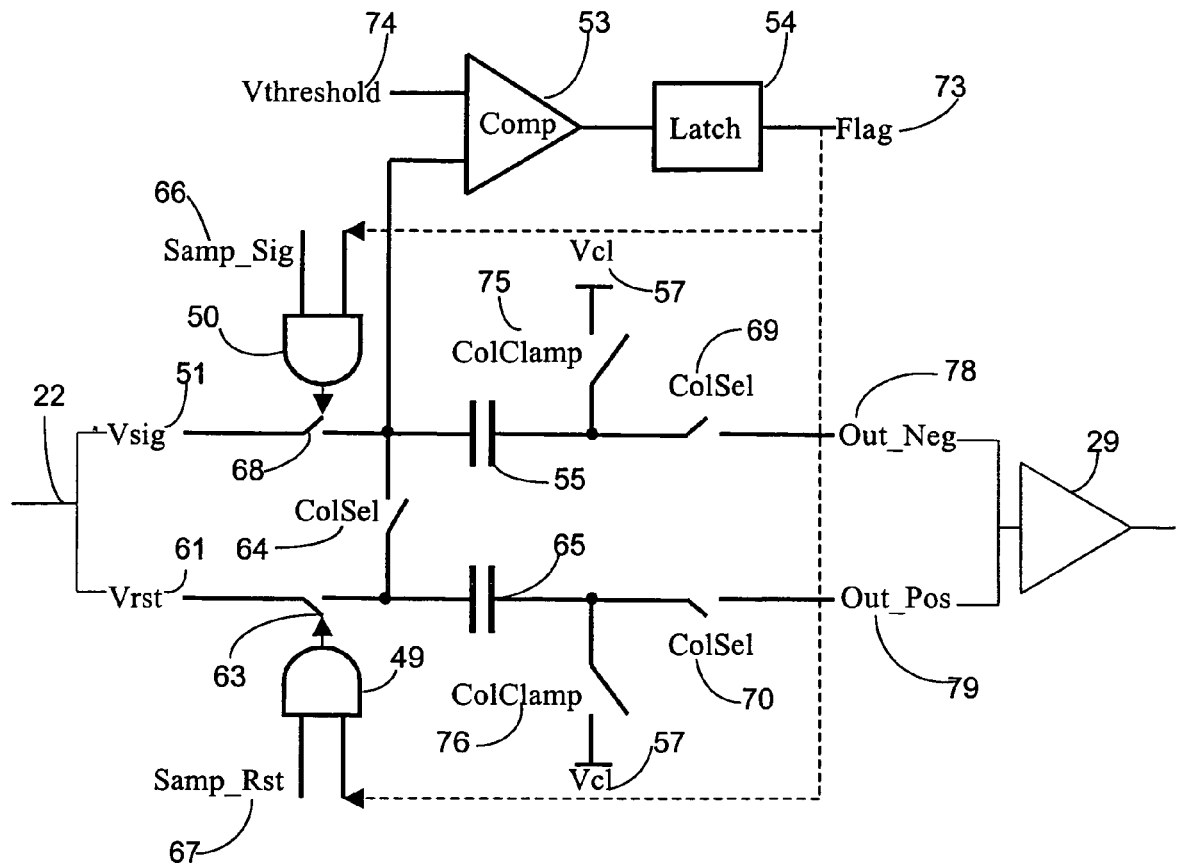
FIG. 6a shows a circuit implementation of a column parallel analog readout circuitry for a Selection-Based Fusion Algorithm constructed in accordance with an exemplary embodiment of the invention.

Each column line 22 in the pixel array 12 is coupled to its own separate sample and hold/circuit which is shown in FIG. 6a. A plurality of 6a circuits are formed within the column-parallel analog readout 23. Each FIG. 6a circuit output is coupled to a one of a set of output amplifiers 29 shown in FIG. 4.

Long and short integration is accomplished using pixels from different adjacent odd and even rows in the pixel array 12 before processing in the sample and hold circuit. Integration is controlled by control logic 27. In this embodiment, odd rows (e.g., rows 16, 18, 20) have a long integration time and even rows (e.g., rows 17, 19, 21) have a short integration time.

Figure 6B:
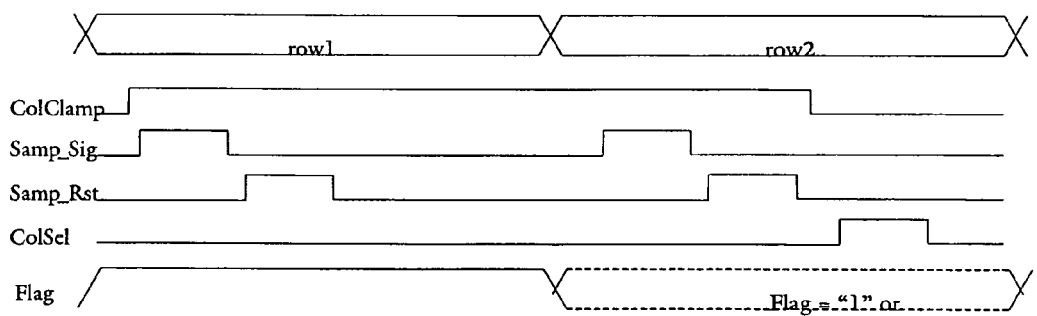
FIG. 6b shows timing of a column parallel analog readout circuitry for a Selection-Based Fusion Algorithm constructed in accordance with an exemplary embodiment of the invention.

It should be noted that the FIG. 6b timing diagram does not show relationships to integration time periods in the pixel array 12 rows. Integration is separately controlled by the timing generator in the control logic 27 circuitry (FIG. 4). Switch inputs, except Flag 73, (FIG. 6a) are also controlled by the control logic circuit 27.

Referring to FIGS. 3, 6a and 6b, first, an odd row (e.g., 16) in the pixel array 12 is selected by row select circuit 24 (FIG. 4). A flag 73 stored in latch 54 is initially set to "1" or high. Next, clamping switches ColClamp 75, 76 are closed which applies clamping voltage Vcl 57 to the backsides of sample and hold capacitors 55 (for Vsig), 65 (for Vrst).

Next, a Samp_Sig 66 signal, controlled by control logic 27 and coupled to Samp_Sig switch 68, is set high. The Samp_Sig switch 68 is coupled between the column line 22 and a Vsig sampling capacitor 55. Samp_Sig switch 68 is responsive to an AND gate 50. The AND gate 50 opens or closes the Samp_Sig switch 68 based on Flag signal 73 and Samp_Sig 66 signal inputs. When Samp_Sig switch 68 is closed, a $Vsig_{Long}$ signal from a selected pixel coupled to column line 22 by a row select switch within the pixel (e.g., in row 16) is sampled and held in the Vsig sampling capacitor 55. Next, the Samp_Sig signal 66 is set to "0" or low, which thereby opens switch 68.

Next, a Samp_Rst 67 signal, controlled by control logic 27 and coupled to Samp_Rst switch 63, is set to "1" or high. The Samp_Rst switch 63 is coupled between the column line 22 and a Vrst sampling capacitor 65. Samp_Rst switch 63 incorporates an AND gate 49, which receives flag signal 73 and a Samp_Rst signal 67. The Samp_Rst switch 63 opens or closes the Samp_Rst switch 63 based on the Flag 73 and the Samp_Rst 67 signal inputs. The selected pixel (e.g., in row 16) is reset with reset voltage Vrst. When Samp_Rst switch 63 is closed, a reset pixel signal in the selected pixel (e.g., in row 16) is sampled and held in the Vrst sampling capacitor 65. Next, the Samp_Rst signal 67 is set low, which thereby opens switch 63.

Flag 73 is either set high ("1") or set low ("0") when comparator 53 compares the sampled $Vsig_{Long}$ signal stored in capacitor 55 with $V_{threshold}$ 74. Comparator 53 has two inputs, one input being $V_{threshold}$ 74 and the other input coupled to the front (pixel array side) of the Vsig sample and hold capacitor 55. $V_{threshold}$ 74 is a value which is approximately equal to a saturation voltage for a pixel in pixel array 12. The output of comparator 53 generates a flag signal which is output to latch 54. Latch 54 stores and outputs Flag 73.

If the $Vsig_{Long}$ signal stored in Vsig sampling capacitor 55 is greater than $V_{threshold}$ 74, then Flag 73 previously set high goes low (Flag="0"), clamping voltage Vcl 57 is isolated by switches 75 and 76, and the ColSel switches 64, 69, 70 are switched high which then outputs the charges stored on capacitors 55, 65 to an opamp 29. ColSel switch 64 is coupled between the front (pixel array) side of sampling capacitors 55, 65 and is controlled by control logic unit 27. ColSel switch 69 is coupled between the backside of sampling capacitor 55 and the Out_Neg 78 output to the opamp 29. ColSel switch 70 is coupled between the backside of sampling capacitor 65 and the Out_Pos 79 output to the opamp 29.

If Comparator 53 determines $Vsig_{Long}$ stored in sampling capacitor 55 is less than $V_{threshold}$ 74, comparator sets latch 54 to maintain output a high ("1") Flag 73. Next, capacitors 55, 65 are discharged (by a circuit not shown), row select 24 selects pixels of an adjacent even row (e.g., row 17), Vsig 51 and Vrst 61 of the even row pixel are sampled as described above, ColClamp switches 75 and 76 are opened, then capacitors 55, 65 are then output into opamp 29 after the ColSel switches 64, 70, 69 are closed.

After the Vsig and Vrst signals that were stored on capacitors 55, 65 have been output, then the fusion circuit is reset as described above, row select 24 selects the next odd row (e.g., row 18) and pixel processing recommences as described above on the next selected odd and adjacent even row (e.g., row 19). Processing of adjacent odd and even rows continues until all rows in the array have been sampled and processed.

An exemplary sample and hold circuit capable of executing an embodiment of an Average-Based Fusion Algorithm 5 implementation will now be explained with reference to circuits shown in FIGS. 4, 7a and 7b. Each column line 22 in the pixel array 12 is coupled to a separate FIG. 7a sample and hold circuit. Each FIG. 7a circuit has four inputs coupled to a single column line 22, where each input is coupled, through a switch, to a sample and hold capacitor for storing a different pixel signal. One set of sample and hold capacitors 91, 81 store a Vsig1 pixel signal ($Vsig_{Long}$) from an odd row (e.g., row 16) and a Vsig2 pixel signal ($Vsig_{Short}$) from an adjacent an even row (e.g., row 17). Another set of sample and hold capacitors 83, 93 stores a respective Vrst1 and Vrst2 pixel reset signals from the selected odd (e.g., row 16) and even (e.g., row 17) rows. An averaging switch 95, 96 is coupled between each of the two sets of sample and hold capacitors 91, 81 and 83, 93. The Vsig1 and Visg 2 capacitors are coupled to output Out_Neg line 111 and the Vrst1 and Vrst2 capacitors are coupled to output Out_Pos line 113. Out_Neg 111 and Out_Pos 113 lines are respectively coupled to the negative and positive inputs of an opamp 29. A plurality of FIG. 7a circuits are formed within the column-parallel analog readout 23 and each are coupled to a respective output amplifier 29 as shown in FIG. 4. Long and short integration is respectively accomplished in the odd and even rows of pixel array 12 before sample and hold processing. It should be noted that the switches in the FIG. 7a circuit and the signals that drive the switches described in FIG. 7b are referred to using the same identifiers and element numbers.

Figure 7A:
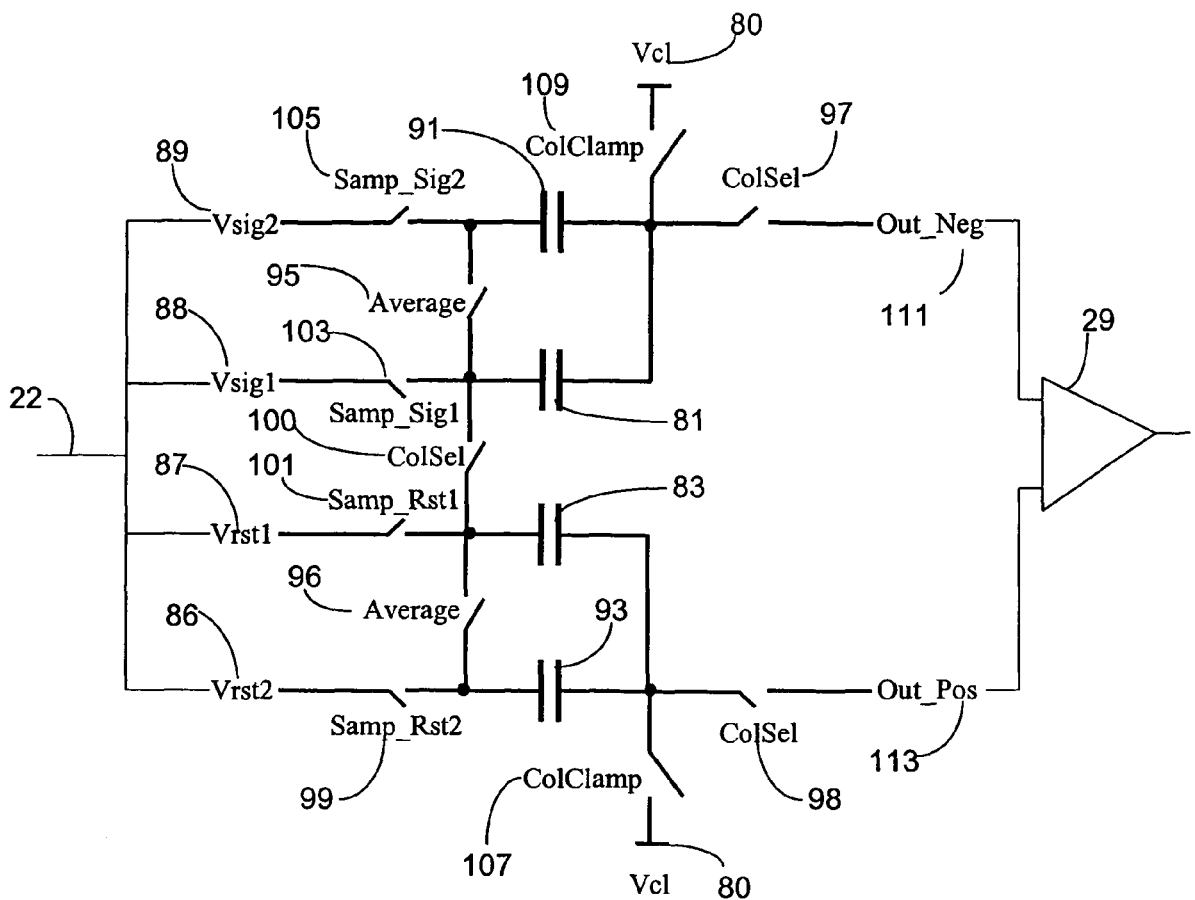
FIG. 7a shows a circuit implementation for a column parallel analog readout circuitry for an Average-Based Fusion Algorithm constructed in accordance with an exemplary embodiment of the invention.
Figure 7B:
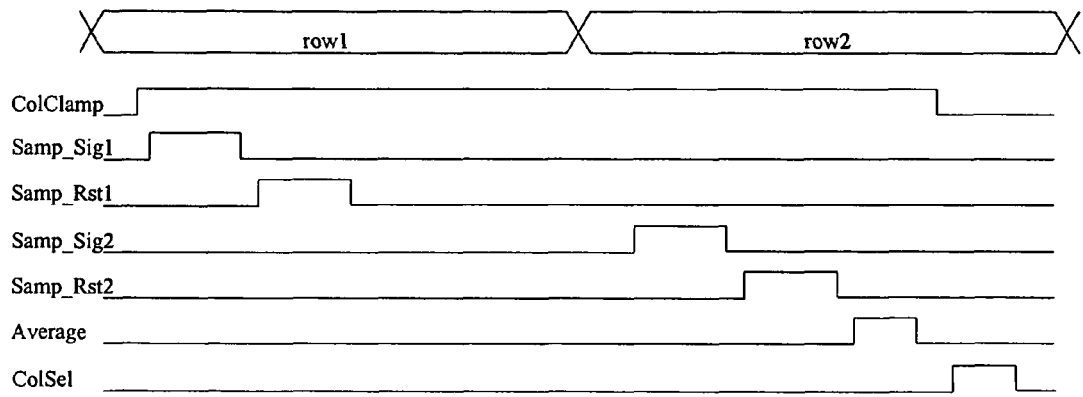
FIG. 7b shows timing for a circuit implementation for a column parallel analog readout circuitry for an Average-Based Fusion Algorithm constructed in accordance with an exemplary embodiment of the invention.

Referring to FIGS. 7a and 7b, an odd row (e.g., row 16) is selected by row select circuit 24. Next, sampling capacitors 91, 81, 83 and 93 are clamped with clamping voltage Vcl 80 by closing ColClamp switches 109, 107 with the signal ColClamp. Next, Samp_Sig1 switch 103 is closed by signal Samp_Sig1 which permits a $Vsig_{Long}$ pixel signal to be sampled and held in Vsig1 sampling capacitor 103. Then Samp_Sig1 switch 103 is opened. Control logic resets the selected odd row (e.g., row 16) with voltage Vrst1 then, the Samp_Rst1 switch 101 coupled between sampling capacitor 83 and column line input 22 is closed by a Samp_Rst1 signal. When Samp_Rst1 switch 103 is closed, the reset pixel signal Vrst1 is sampled from the selected pixel (e.g., 16) and held in Vrst1 sampling capacitor 83, and then the SampRst1 switch 101 is opened. Next, an adjacent even row (e.g., row 17) is selected. Samp_Sig2 switch 105 is closed by signal Samp_Sig2, $Vsig_{Short}$ pixel signal in the selected pixel is sampled and held in sampling capacitor 91 then Samp_Sig2 switch 105 is opened. Next, Samp_Rst2 switch 99 is closed by signal Samp_Rst2, the Vrst2 86 signal in the selected pixel is sampled and held in sampling capacitor 93 and then Samp_Rst2 switch 99 is opened. Next, averaging is performed by closing an averaging switch 95 between capacitors 91, 81 and another averaging switch 96 between capacitors 83 and 93. Next, clamping voltage Vcl 80 is removed from capacitors 91, 81, 83 and 93 by opening Col_Clamp switches 107 and 109 with the ColClamp signal. Next, column select switches 100, 97 and 98 are closed by the ColSel signal which outputs the averaged Vsig and Vrst signals respectively stored in capacitors 91, 81 and 83, 93 to the opamp 29 through Out_Neg 111 and Out_Pos 113 lines.

The circuit is next reset, then the next odd row (e.g., row 18) of pixel array 12 is selected and sampling of the selected odd row (e.g., row 18) as described above occurs. Next, the even row adjacent to the previously selected odd row is selected (e.g., row 19) and the two adjacent row averaging cycle commences as described above. The two-row average processing cycle continues until all rows have been sampled, averaged and output to output amplifier 29. Then, the integration cycle in the pixel array 12 recommences as directed by control logic unit 27. After a new pixel array integration period, row processing cycle commences again if so directed by control logic unit 27.

A exemplary sample and hold circuit capable of executing Combined Selection-Based and Average-Based Algorithm 6 will now be explained with reference to circuits shown in FIGS. 3, 4, 8a and 8b. Integration is performed in the pixel array 12 so that odd rows (e.g., rows 16, 18, 20) of the pixel array 12 have a long integration time and even rows, (e.g., rows 17, 19, 21) of the pixel array 12 have a short integration time.

A column line 22 from the pixel array 12 is coupled to four inputs of a sample and hold circuit. The first input is a Vsig1 input 133 which is coupled to a sampling capacitor 161 for storing and holding a $Vsig_{Long}$ pixel signal. The second input coupled to the array column line 22 is the Vrst1 signal input 151 which is coupled to a sampling capacitor 163 which stores and holds a Vrst1 pixel reset signal. The third input is a Vsig2 input 129 which is coupled to a capacitor 137 which samples and holds a $Vsig_{Short}$ pixel signal. The fourth input is a Vrst2 input 155 which is coupled to a sampling capacitor 165 which samples and holds a Vrst2 pixel reset signal. Averaging operations are controlled by averaging switch 135 (on pixel side inputs and between capacitors 161, 137) and average switch 159 (on pixel side inputs and between capacitors 163, 165). Averaging switch 135 is coupled to the front and between capacitors 137 and 161.

Comparator 121 has as inputs a $V_{threshold}$ 119 input and is coupled to the pixel array 12 side of the Vsig1 capacitor. Comparator 121 comparison signal is output to Latch 123, which is a 1-bit memory element, that outputs Flag 125 to inverter 124. Inverter 124 outputs Flag 126 signal to AND gates 134, 136. Average signal 135, 159 is also coupled to AND gates 134, 136. AND gates 134, 136 outputs are coupled respectively to averaging switches 135, 159. Capacitors 161, 137 and 165 and 163 are respectively coupled to opamp 29 by outputs Out_Neg 143 and Out_Pos 173.

Figure 8A:
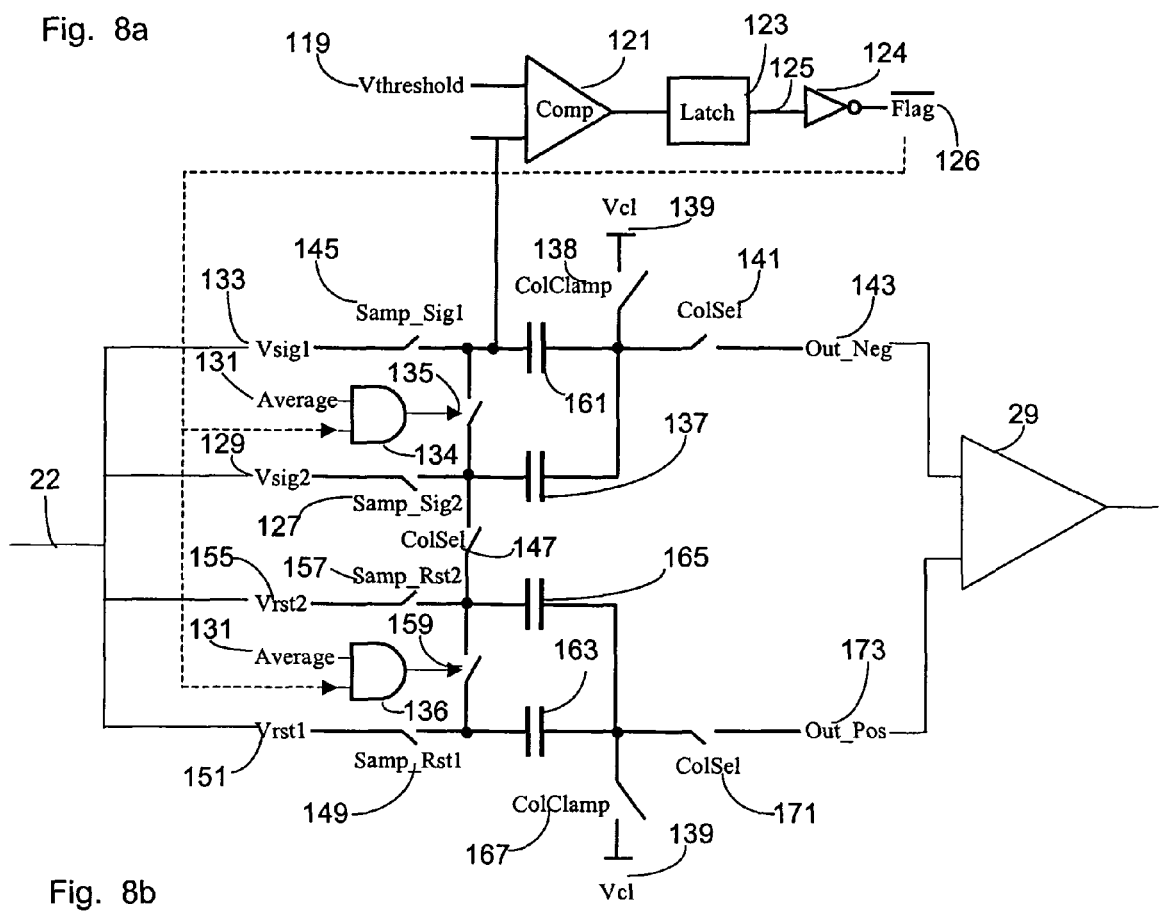
FIG. 8a shows a circuit implementation for a column parallel analog readout circuitry for a Selection and Average-Based Fusion Algorithm constructed in accordance with an exemplary embodiment of the invention.
Figure 8B:
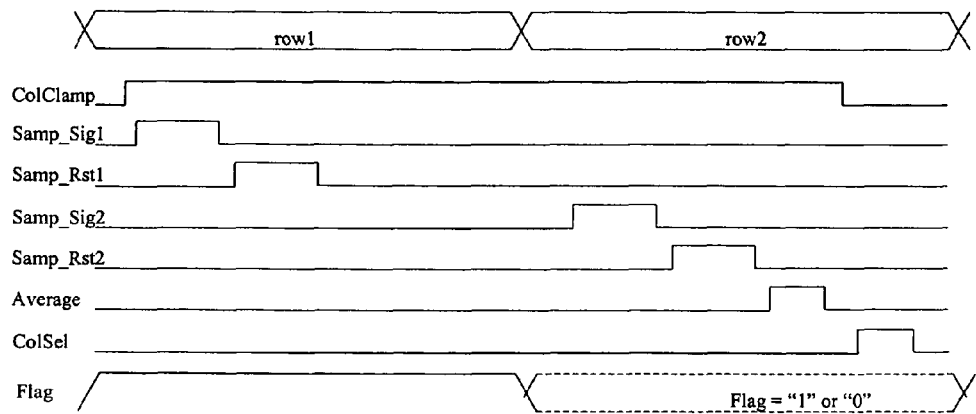
FIG. 8b shows timing for a for a column parallel analog readout circuitry for a Selection and Average-Based Fusion Algorithms constructed in accordance with an exemplary embodiment of the invention.

Referring to FIGS. 8a and 8b, an odd row (e.g., row 16) in pixel array 12 is selected by row select circuit 24, then pixel signal $Vsig_{Long}$ is sampled at sampling capacitor 161 by operating Samp_Sig1 switch 145. Next, each pixel in the selected row is reset and the reset value (Vrst1) 151 is sampled and held at sampling capacitor 163 by closing, then opening Samp_Rst1 switch 149. Next, an adjacent even row (e.g., row 17) of the pixel array 12 is selected by row select circuit 24. Then, $Vsig_{Short}$ pixel signal and pixel reset signal (Vrst2) 155 are respectively sampled and held in the second set of sampling capacitors 137 (Vsig2), 165 (Vrst2) using Samp_Sig2 127 and Samp_Rst2 157 switches.

A comparator 121 has one input coupled to the pixel array 12 side of capacitor 161 storing the sampled and held Vsig1 133 signal and a second input coupled to a $V_{threshold}$ signal 119. The comparator 121 compares the Vsig1 133 signal and the $V_{threshold}$ 119 signal to determine if Vsig1>$V_{threshold}$. If Vsig1 133 is greater than $V_{threshold}$, then the comparator 121 sets latch 123, which is a 1-bit memory storage unit low or "0". Latch 123 outputs a Flag 125 value of "0" (Vsig1>Vthreshold) or "1" if (Vsig1<Vthreshold). Latch 123 can be reset to store a "1" Flag 125 by control logic 27 in order to reset the Latch. Latch 123 is coupled to an inverter 124 which outputs a Flag signal 126 (inverted Flag 125) which is in turn coupled to AND gates 134, 136. In this embodiment, the AND gates also receive an average signal 131 from control logic unit 27 as well as the Flag 126 input signal. AND gates 134, 136 outputs respectively control averaging switches 135, 159. Averaging switch 135 controls a line is coupled to the front or pixel array 12 side and between Vsig1 and Vsig2 capacitors 137, 161 for performing charge averaging between the two capacitors. Averaging switch 159 is coupled to the front or pixel array 12 side and between Vrst1 and Vrs2 capacitors 163, 165 for performing charge averaging between the two capacitors.

Referring to Algorithm 6, averaging will occur between capacitor sets or averaging will be skipped depending on the Flag value 125 output by latch 123. Charges stored on Vsig1 capacitor 161 and Vsig2 capacitor 137 will be averaged in response to a Flag signal 126. The charges stored in the Vrst1 capacitor 163 and Vrst2 capacitor 165 will also simultaneously be averaged in response to a Flag signal.

If Vsig1 does not exceed Vthreshold, then Flag 125 value will be set as Flag="1" (Flag 126="0") and clamping voltage Vcl 139 previously supplied is removed from the backside of capacitors 137, 161, 163 and 165. Then, an output column line Out_Neg 143 coupled to the backside of Vsig1 and Vsig2 capacitors 137, 161 as well as another output column line Out_Pos 173 coupled to the back side of Vrst1 and Vrst2 capacitors 163, 165 within the crowbar circuit in FIG. 8a are selected by ColSel switches 147, 141 and 171. ColSel switch 147 is coupled to the pixel array 12 side and between capacitor sets 161, 137 and 165, 163. ColSel switch 171 is coupled between opamp 29 and capacitors 163, 165. ColSel switch 141 is coupled between opamp 29 and capacitors 137, 161. Once ColSel switches 147, 141 and 171 are closed, two signals on the two sets of capacitors storing Vsig2 (137) and Vrst2 (165) in the crowbar circuit become the differential input for operational amplifier (opamp) 29. The opamp 29 output voltage is sampled in ADCs 33 and then analog to digital signal conversion commences.

On the other hand, if the comparator 123 determines Vsig1 133 exceeds $V_{threshold}$ 119, then Flag will be set to "0" (Flag 126="1"). Control logic unit 27 initially set the average signal 131 to high or "1", thus the averaging switches 135 and 159 will close, permitting charges on capacitors 137 and 161 as well as capacitors 163 and 165 to equalize thereby performing averaging operations. Previously supplied clamping voltage Vcl 139 is next removed from capacitors 137, 161, 163 and 165. Then, ColSel switches 147, 141 and 171 are closed so the two averaged signals on the two sets of capacitors storing Vsig1 (161), Vsig2 (137) and Vrst1 (163), Vrst2 (165) in the crowbar circuit become the differential input for operational amplifier (opamp) 29 (i.e., through Out_Neg 143 and Out_Pos 173 lines). The opamp 29 output voltage is analog to digital converted in ADC 33.

Once opamp 29 outputs the averaged signals, then the next odd row is selected (e.g., row 18) and processed, along with adjacent even row (e.g., row 19). The sample and hold processing cycle described above is then repeated until each set of adjacent sets of odd and even rows in the pixel array 12 are processed.

The pixel array 12 can contain a variety of pixels which operate, for example, with rolling electronically controlled shutter operations or global pixels which contain extra storage elements to contain transferred pixel data for subsequent readout. A mechanical shutter can also be used in conjunction with electronically controlled shutter operations in the pixel array 12 which is useful to control pixel integration.

A gamma table can be used with the invention to compress the dynamic range of the fused high dynamic range image for displays which typically utilize 8-bit display devices. Range compression from, for example, a 12 bit input to an 8-bit output, is accomplished by using a Gamma table. The gamma table provides correction to a linear response or relationship which affects converted image data when an X-bit input is converted, or compressed, to a Y-bit output. The gamma table circuit can be incorporated into the digital image processing unit 37 which can perform dynamic range compression associated with data conversion or compression.

Another embodiment of the invention can include a circuit in the digital image processing unit 37 (FIG. 4) which receives the flag value stored in the latch (e.g., FIG. 6a, 54) from an embodiment of a selection algorithm based implementation such as disclosed in the FIG. 6a or FIG. 8a circuits. Additional signal processing of a pixel signal can be performed in an imager processing unit 37 based upon the Flag value in a circuit implementation using a form of the selection-based fusion algorithm. Accordingly, the digital image processing unit 37 would receive not only the ADC(s) output, but also a flag value which is then used to perform further advanced image processing.

The control of the switches within the fusion algorithm sample and hold circuits can also be controlled by other circuit(s) outside of the control logic unit 27. For example, control logic can be included within the column select 25 circuitry or within the column parallel analog readout circuitry 23.

While an exemplary embodiment of the invention has been described and illustrated, it should be apparent that many changes and modifications can be made without departing from the spirit or scope of the invention. Accordingly, the invention is not limited by the description above but is only limited by the scope of the appended claims.

What is claimed as new and desired to be protected by Letters Patent of the United States is:

1. An imager comprising:
   a first pixel circuit in a first pixel row for outputting at least a first pixel image signal accumulated during a first integration period;
   a second pixel circuit in a pixel row different from the first pixel row for outputting at least a second pixel image signal accumulated during a second integration period, which is shorter than said first integration period; and
   a sample and hold circuit configured to selectively acquire at least one of said first and second pixel image signals and perform a comparison of said first pixel image signal to a threshold signal value, and to output a pixel output signal generated from at least one of said first and second pixel image signals based on the result of said comparison.

2. The imager of claim 1, wherein said pixel output signal is one of a combination of said first and second pixel signals or a selection of one of said first and second pixel image signals.

3. The imager of claim 2, wherein said pixel output signal comprises a combination of said first and second pixel signals when said first pixel image signal is greater than said threshold signal value.

4. The imager of claim 3, wherein said combination of said first and second pixel signals is an average of said first and second pixel signals.

5. The imager of claim 2, wherein said pixel output signal comprises said first pixel image signal when said first pixel image signal is greater than said threshold signal value.

6. The imager of claim 2, wherein said pixel output signal comprises said second pixel image signal when said first pixel image signal is less than said threshold signal value.

7. The imager of claim 1, wherein said threshold signal value is approximately equal to a saturation value for a pixel in either said first pixel row or said pixel row different from said first pixel row.

8. A readout system comprising:
   at least one sample and hold circuit configured to sample a first pixel signal from a first selected row of pixels having a first integration period, said sample and hold circuit further configured to selectively sample a second pixel signal from a second adjacent selected row of pixels, which has a second integration period shorter than said first integration period;
   a switching circuit coupled to said at least one sample and hold circuit and being configured to control sampling of said first and second pixel signals; and
   a comparator configured to determine if a sampled first pixel signal exceeds a threshold signal value,
   said switching circuit being further configured to operate said at least one sample and hold circuit to sample said first pixel signal and to provide a first output signal if said comparator determines that said threshold is exceeded by said sampled first pixel signal, and to operate said at least one sample and hold circuit to sample and hold said second pixel signal and to provide a second output signal when said threshold is not exceeded,
   wherein said first output signal is different from said second output signal.

9. The readout system of claim 8, wherein said first output signal is a combination of said first and second pixel signals.

10. The readout system of claim 9, wherein said combination of said first and said second pixel signals is an average of said first and second pixel signals.

11. The readout system of claim 8, wherein said first output signal is said first pixel signal.

12. The readout system of claim 8, wherein said second output signal is said second pixel signal.

13. The readout system of claim 8, wherein said at least one sample and hold circuit comprises a plurality of sample and hold circuits.

14. The readout system of claim 13, wherein each of said plurality of sample and hold circuits is coupled to a column line.

15. The readout system of claim 8, wherein a pixel array comprises a plurality of sets of said first row of pixels with a first integration period and said second adjacent row of pixels with a shorter integration period.

16. The readout system of claim 8, wherein said switching circuit is configured to control sampling of said pixel rows in a pixel array such that said sampling begins at a first row on one end of the pixel array and is repeated for each of a said first row and said second adjacent row set, said sampling proceeding in the direction of the opposite end of said pixel array where said first row is located.

17. The readout system of claim 8, further comprising a digital image processing unit, said unit comprising a gamma table lookup for conversion of an output signal from one display output signal to another.

18. The readout system of claim 8, further comprising a flag storage circuit configured to store a flag, wherein said flag is set to a first value if said comparator determines said threshold is exceeded and said flag is set to a second value if said comparator determines said threshold is not exceeded said flag being used to control said at least one sample and hold circuit.

19. The readout system of claim 18, further comprising an amplifier for output of said at least one sample and hold circuit and a digital image processing circuit coupled to said amplifier, wherein said digital image processing circuit performs additional image processing based on the status of said flag.

20. The readout system of claim 8, wherein said threshold value is a signal that corresponds to a pixel saturation signal.

* * * * *